(12) United States Patent
Nomura

(10) Patent No.: US 9,866,026 B2
(45) Date of Patent: Jan. 9, 2018

(54) METHOD OF MANAGING ELECTRIC POWER, POWER MANAGEMENT DEVICE AND PROGRAM

(71) Applicant: NEC Corporation, Tokyo (JP)

(72) Inventor: Youjirou Nomura, Tokyo (JP)

(73) Assignee: NEC Corporation, Tokyo (JP)

( * ) Notice: Subject to any disclaimer, the term of this patent is extended or adjusted under 35 U.S.C. 154(b) by 301 days.

(21) Appl. No.: 14/427,395

(22) PCT Filed: Sep. 12, 2013

(86) PCT No.: PCT/JP2013/074724
§ 371 (c)(1),
(2) Date: Mar. 11, 2015

(87) PCT Pub. No.: WO2014/042219
PCT Pub. Date: Mar. 20, 2014

(65) Prior Publication Data
US 2015/0244173 A1    Aug. 27, 2015

(30) Foreign Application Priority Data
Sep. 12, 2012   (JP) .............................. 2012-200392

(51) Int. Cl.
*H02J 3/32*   (2006.01)
*H02J 3/14*   (2006.01)
(Continued)

(52) U.S. Cl.
CPC ................. *H02J 3/32* (2013.01); *H02J 3/14* (2013.01); *H02J 3/382* (2013.01); *H02J 3/46* (2013.01);
(Continued)

(58) Field of Classification Search
CPC ...... H02J 3/32; H02J 3/14; H02J 3/382; H02J 3/46; H02J 7/0063; H02J 7/35;
(Continued)

(56) References Cited

U.S. PATENT DOCUMENTS
2012/0181974 A1   7/2012 Kuniyosi et al.

FOREIGN PATENT DOCUMENTS
JP   2003-244840   8/2003
JP   2008-62826   3/2008
(Continued)

OTHER PUBLICATIONS
International Search Report dated Nov. 26, 2013 in corresponding PCT International application.

*Primary Examiner* — Hal Kaplan
(74) *Attorney, Agent, or Firm* — Finnegan, Henderson, Farabow, Garrett & Dunner, L.L.P.

(57) ABSTRACT

A method of managing electric power for managing power, within a group, said power is to be used by a first user with a power storage system and a second user without the power storage system, the method including: (a) collecting data regarding load power of the first user and the second user and calculating total load power within the group; (b) determining whether the total load power is equal to or greater than a peak cut power; (c) determining whether a value of [total load power−peak cut power] is smaller than the load power of the first user when determination in the step (b) is Yes; and (d) causing the power storage system to discharge at the value of [total load power−peak cut power], when determination in the step (c) is Yes.

10 Claims, 6 Drawing Sheets

(51) Int. Cl.
   *H02J 3/46*     (2006.01)
   *H02J 7/35*     (2006.01)
   *H02J 3/38*     (2006.01)
   *H02J 7/00*     (2006.01)

(52) U.S. Cl.
   CPC .............. *H02J 7/0068* (2013.01); *H02J 7/35* (2013.01); *H02J 2003/143* (2013.01); *Y02B 10/14* (2013.01); *Y02B 70/3225* (2013.01); *Y02B 70/3266* (2013.01); *Y04S 20/222* (2013.01); *Y04S 20/242* (2013.01); *Y10T 307/414* (2015.04)

(58) Field of Classification Search
   CPC .............. H02J 2003/143; H02J 7/0068; Y10T 307/414; Y02B 10/14; Y02B 70/3225; Y02B 70/3266; Y04S 20/222; Y04S 20/242
   USPC ........................................................ 307/32
   See application file for complete search history.

(56) References Cited

FOREIGN PATENT DOCUMENTS

| | | |
|---|---|---|
| JP | 2008-118805 | 5/2008 |
| JP | 2008-306832 | 12/2008 |
| JP | 2011-78168 | 4/2011 |
| JP | 2012-19598 | 1/2012 |
| JP | 2012-95455 | 5/2012 |

METHOD OF MANAGING ELECTRIC POWER, POWER MANAGEMENT DEVICE AND PROGRAM

CROSS-REFERENCE TO RELATED PATENT APPLICATIONS

This application is a National Stage Entry of International Application No. PCT/JP2013/074724, filed Sep. 12, 2013, which claims priority from Japanese Patent Application No. 2012-200392, filed Sep. 12, 2012. The entire contents of the above-referenced applications are expressly incorporated herein by reference.

TECHNICAL FIELD

The present invention relates to an art for managing power supply to users in a certain group for example. The present invention relates particular to a method of managing electric power, a power management device and a program, which allow electric power used in the group to be flattened by totally managing electric power for a plurality of users.

BACKGROUND ART

In recent years, it is proposed that, regarding power supply to residences and buildings among other things, supply control of the power is performed using IT (information technology) technology and that power storage system in addition to the grid power from a power plant is used. For example, Patent Document 1 discloses disposing photovoltaic power generator and a power storage system in a residence, outputting power from the photovoltaic power generator to an external power system, and using the power for charging the power storage system.

PRIOR ART REFERENCE

Patent Document 1: Japanese Patent Laid-Open No. 2011-078168

SUMMARY OF INVENTION

Technical Problem

Although Patent Document 1 discloses managing individual electric powers management for each residence, it does not focus on total electric power management in an area. It should be difficult to flatten electric power in an area even if only users having the power storage system are managed because there are apparently a lot of users not having a power storage system, as well as the users having a power storage system.

Therefore, an object of the present invention is to provide an method of managing electric power, a power management device and a program, which allow electric power used in the group to be flattened by totally managing electric power for a plurality of users.

Solution to Problem

In order to achieve the object above, a method of managing electric power according to an embodiment of the present invention is as follows:

1. a method of managing electric power, within a group, used by a first user having a power storage system and a second user not having the power storage system, includes:

(a) collecting data regarding load power of the first and second users and obtaining total load power within the group;

(b) determining whether the total load power is equal to or greater than peak cut power;

(c) determining whether a value of [total load power−peak cut power] is smaller than the load power of the first user when determination in the step (b) is Yes; and (d) causing the power storage system to discharge at the value of [total load power−peak cut power] when determination in the step (c) is Yes.

Description of Terms

"First user" is a user at least having the power storage system, and a user is also included therein, for example, having a power generator such as a photovoltaic power generator in addition to the power storage system.

"second user" is a user not having the power storage system or the photovoltaic power generator.

As the "users", residences, buildings, commercial facilities, industrial facilities, medical facilities and the like are included.

As to "time segments", the length of one time segment can be arbitrarily configured, and, for example, the length of one time segment may be several minutes to several tens of minutes, an hour to several hours or the like. Moreover, each time segment is not needed to be constant.

Advantage of the Invention

According to the present invention, a method of managing electric power, a power management device and a program can be provided, which allow electric power used in the group to be flattened by totally managing electric power for a plurality of users.

DESCRIPTION OF EMBODIMENTS

Embodiments of the present invention are described with reference to the drawings. It is noted that configurations, functions, operations and the like described below are according to an embodiment of the present invention and are not intended to limit the present invention.

Figure 1:
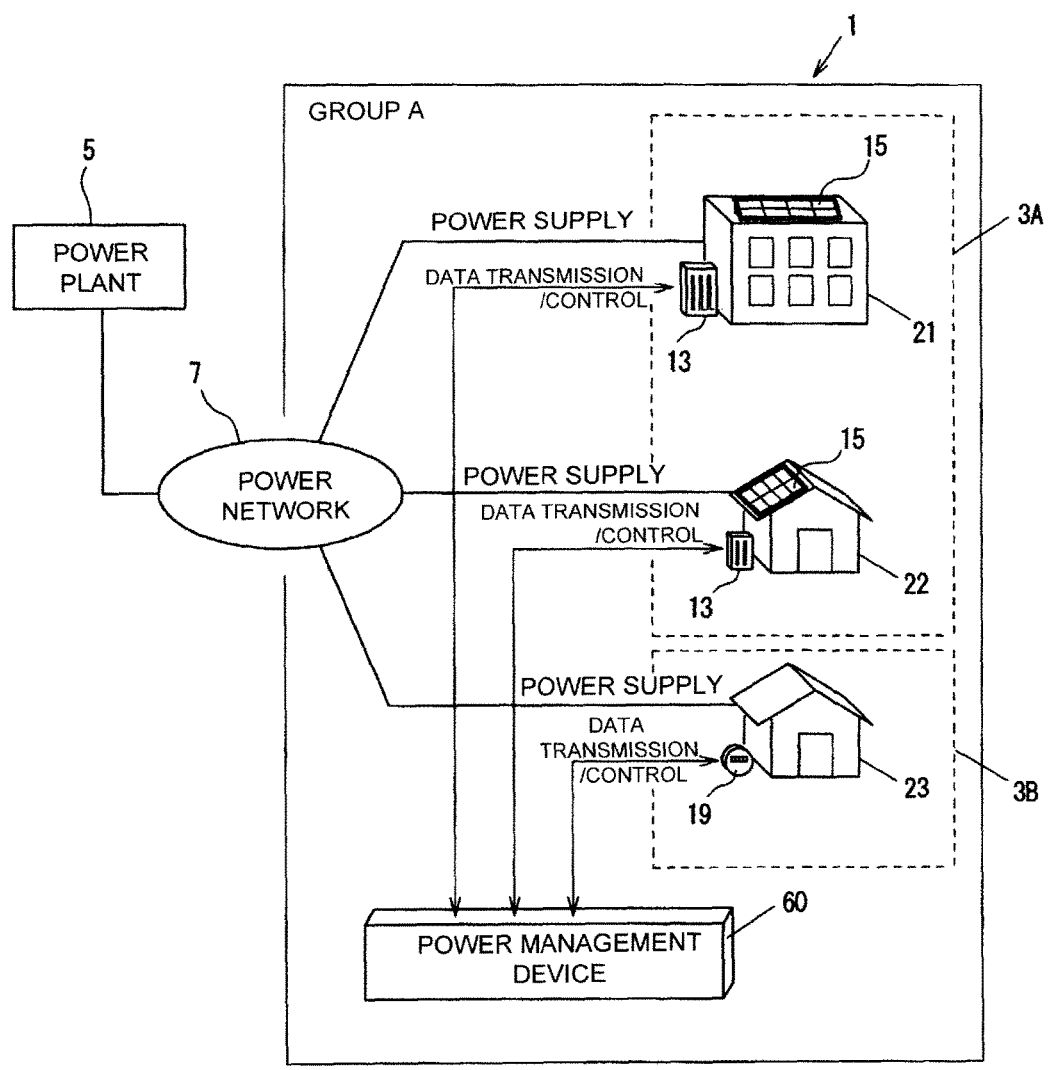
FIG. 1 is a schematic diagram illustrating an electric power management system according to an embodiment of the present invention.

As shown in FIG. 1, an electric power management system 1 here is configured to manage power used in a building 21 and residences 22 and 23 totally. Electric power from a power plant 5 is supplied to the building 21 and the residences 22 and 23 via a power network 7. The electric power is called "grid power".

It is noted that while only the building and the residences are shown in FIG. 1, users for example stores such as commercial facilities or industrial facilities such as factories may be included. "Group A" which the building 21 and the residences 22 and 23 belong to may be, but not limited to, a predetermined area (the area may be one region or may be regions separate from one another), for example.

The building 21 and the residence 22 include a power storage system 13 and a photovoltaic power generator 15. In the embodiment, user having the power storage system 13 and the photovoltaic power generator 15 is referred to as a "first user (3A)". On the other hand, the residence 23 does not include the power storage system or the photovoltaic power generator. In the embodiment, such a user is referred to as a "second user (3B)". It is noted that while only one second user 3B is shown in FIG. 1, of course, the group includes a plurality of such users.

It is noted that while the photovoltaic power generators 15 are represented by way of example in the embodiment as the power generators, for example, they may be other kinds of power generators such as fuel cells.

In the description below, the photovoltaic power generator is sometimes referred to as a "PV power generator" and the power from the PV power generator as "PV generated power" or the like.

Figure 2:
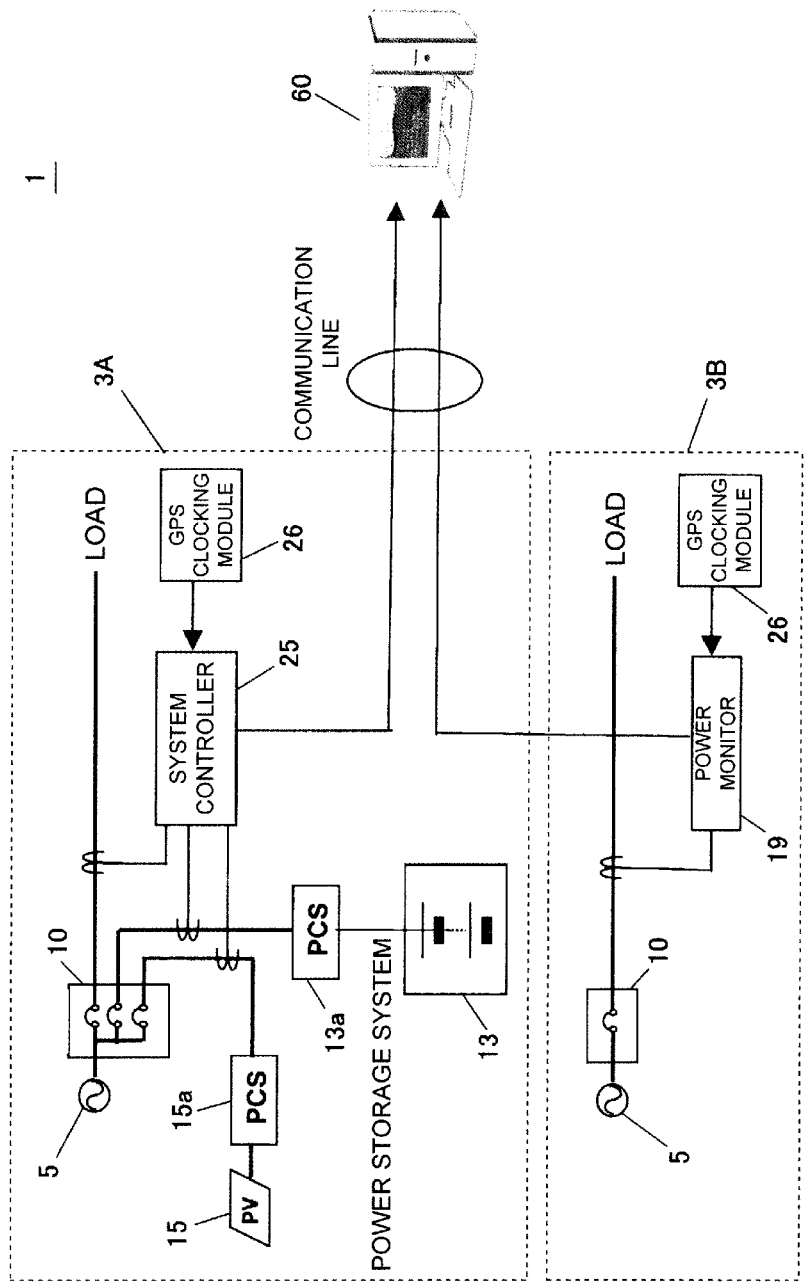
FIG. 2 is a diagram schematically illustrating a configuration of the system in FIG. 1.

FIG. 2 is a diagram schematically illustrating a configuration of the system in FIG. 1. As shown in FIG. 2, in the first user 3A, a load is configured to be supplied with a grid power, a PV generated power or a power of the power storage system via a panel board 10. Reference numbers 13a and 15a refer to power conditioners for converting DC currents from the power storage system 13 and the PV power generator 15 into AC power, respectively.

A system controller 25 disposed in the first user 3A is configured to collect various kinds of information in the user 3A (for example, information regarding load power, the grid power, the PV generated power and the power of the power storage system), to transmit the information to outside, and to control operations of the PV power generator 15 and the power storage system 13 and the like.

A GPS clocking module 26 may be disposed in the first user 3A to allow accurate time data to be obtained in each user. As long as accurate time data can be obtained, any device other than the GPS clocking module may be used, of course.

In the first user 3A, basically, following managements for electric power and information are performed:

(a) supplying grid power to various electric devices in building/residence;

(b) supplying PV generated power to various electric devices in building/residence;

(c) supplying power of the power storage system to various electric devices in building/residence;

(d) charging the power storage system using the grid power or the PV generated power; and (e) transmitting information regarding power in building/residence and the like to outside via a network or the like.

As to the function of (e), system controller 25 itself may be configured to transmit information by using a network connection function provided in the controller. Alternatively, such information may be configured to be transmitted to outside via any server or the like provided in the building or the residence.

Referring to FIG. 1 and FIG. 2 again, in a second user 3B, only the grid power is to be supplied via a panel board 10 since the second user 3B does not include the power storage system or the like. A power monitor 19, disposed in the second user 3B, may be configured to collect various kinds of information in the user (for example, information regarding a load power and a grid power), to transmit the information to outside, for example. Similarly to the first user 3A, a GPS clocking module 26 is provided therein.

In the second user 3B, basically, following managements for electric power and information are performed:

(a) supplying grid power to various electric devices in the residence; and (e) transmitting information regarding load power for example in the residence to outside via a network or the like.

As shown in FIG. 1 and FIG. 2, the electric power management system 1 according to the embodiment includes a power management device 60 for totally managing the power in the group A. The power management device 60, for example, may have a computer for a server and the like or may be consisted of a computer for a server.

The power management device 60 at least has functions below:

(a) a function of collecting data regarding the load power from each first user 3A (referred to as "load 1"), a function of collecting data regarding the load power from each second user 3A (referred to as "load 2"), and a function of adding the load 1 and the load 2 together to calculate "total load power";

(a') a function of collecting data regarding PV generated power of each first user 3A;

(b) a function of determining whether a value of [total load power−PV generated power] is equal to or greater than peak cut power;

(c) a function of determining whether a value of [total load power−PV generated power−peak cut power] is smaller than a value of [load 1−PV generated power] when determination of (b) above is Yes; and (d) a function of causing the power storage system to discharge at the value of [total load power−PV generated power−peak cut power] when determination of (c) above is Yes.

The power management device 60 may also have a function of determining a power usage situation in the group A or a demand response control (control for changing a power consumption pattern), for example.

Figure 3:
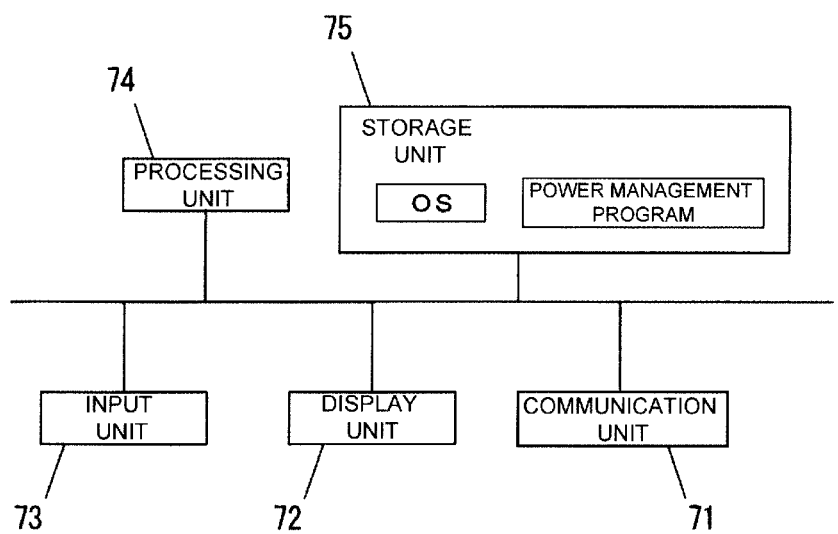
FIG. 3 is a block diagram illustrating one example of an internal configuration of a power management device.

As shown in FIG. 3, the computer for a server as the power management device may be a computer which has, for example, a communication unit 71, a display unit 72, an input unit 73, a processing unit 74, a storage unit 75 and the like, where individual units are connected to one another via a bus such that they can transmit and receive data to/from one another. The communication unit 71 is configured to for example perform external communication via a network, and is realized, for example, by a network interface and the like. The display unit 72 is configured to display various data in accordance with instructions from the processing unit, and is realized, for example, by a liquid crystal display and the like. The input unit 73 is a device with which the user inputs various data, and is realized, for example, by a keyboard, a mouse and the like. The processing unit (processor) 74 is configured to conducts transmission and reception of data between the individual units via a predetermined memory, and to perform various controls. The storage unit 75 is configured to store data from the processing unit and read out the stored data, and is realized, for example, by a HDD (Hard Disk Drive), a SSD (Solid State Drive) and the like. It is noted that the individual functions of the power management device 60 as mentioned above may be achieved by the processing unit 74 executing an electric power management program in the storage unit 75, for example.

The program, by way of example, may be stored in the storage unit of the computer in advance, may be supplied via a network such as an internet, or may be supplied to via a predetermined storage medium storing data of the program.

Figure 4:
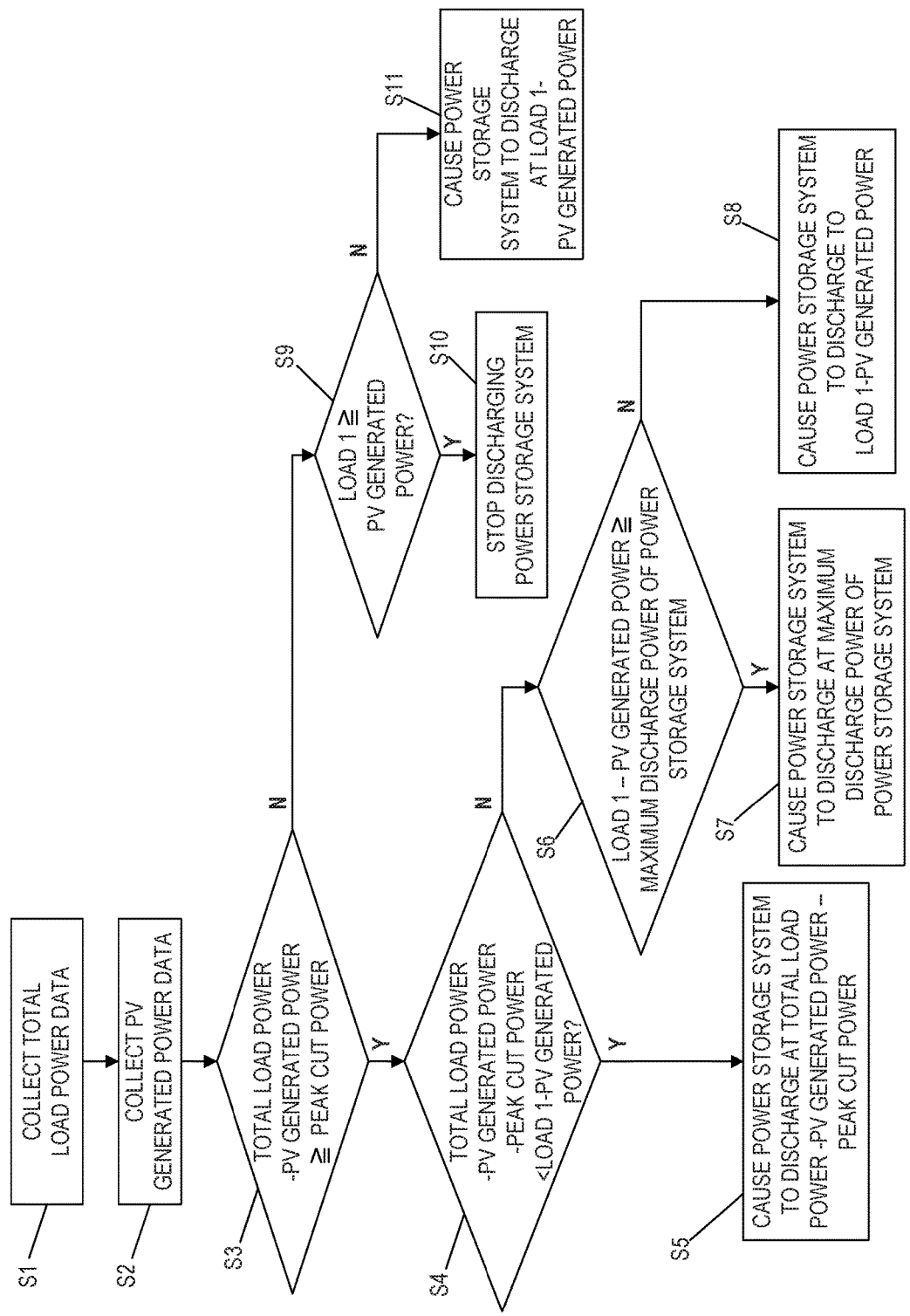
FIG. 4 is a flowchart illustrating a series of operations in a method of managing electric power according to an embodiment of the present invention.
Figure 5:
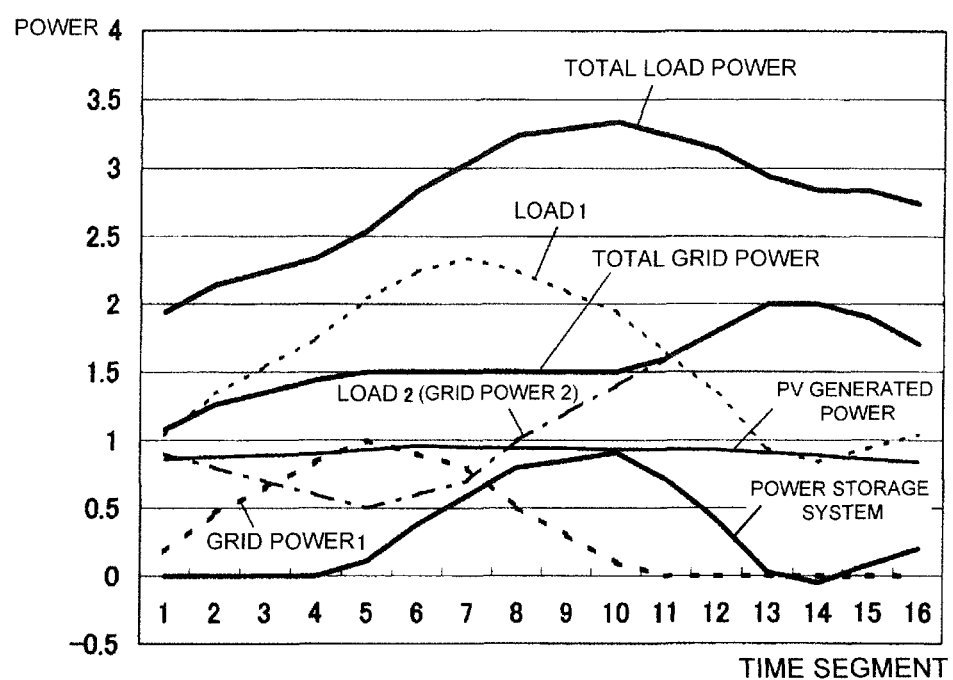
FIG. 5 is a graph illustrating flattening of power, in a group, according to the method of managing electric power of the embodiment of the present invention.

Hereafter, a method of managing electric power in the embodiment is described by way of example. FIG. 4 is a flowchart illustrating a series of operations according to an embodiment. FIG. 5 is a graph illustrating flattening of the electric power in the group in the case where the method of managing electric power according to the embodiment is used. In FIG. 5, time segments "1" to "16" correspond to time segments "1" to "16" in Table 1 below (which do not represent time in a 24-hour manner).

It is noted that, in the description below:

"Peak cut power" is a reference electric power value at which power supply from the power storage system is started in order to cut peaks of the electric power, and is herein set to be "1.50".

"Discharge power of power storage system" represents electric power amount discharged from the power storage system in the group A, and its maximum output is set to be "2.00".

Time Segments "1" to "4"

In these time segments, the grid power and the PV generated power are used, but the power storage system does not discharge power.

First of all, in step S1, the power management device 60 collects data of "load 1" and "load 2" from the first and second users 3A and 3B to calculate the "total load power". In this time segment, (load 1, load 2, total load power)= (1.04, 0.9, 1.94).

Next, in step S2, data of the PV generated power is collected from the first user 3A. In this time segment, PV generated power=0.86.

Next, in step S3, determination is made as to whether the value of [total load power−PV generated power] is equal to or greater than the peak cut power. In this time segment, since 1.94−0.86=1.08, being less than the peak cut power of 1.5, the determination in step S3 is No.

Next, in step S9, determination is made as to whether the load 1 is equal to or greater than the PV generated power. In this time segment, since the load 1 is 1.04, being greater than the PV generated power of 0.86, the determination in step S9 is Yes.

TABLE 1

| Time | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Load 1 | 1.04 | 1.34 | 1.54 | 1.74 | 2.04 | 2.24 | 2.34 | 2.24 | 2.09 | 1.94 | 1.64 | 1.34 | 0.94 | 0.84 | 0.94 | 1.04 |
| Load 2 | 0.9 | 0.8 | 0.7 | 0.6 | 0.5 | 0.6 | 0.7 | 1 | 1.2 | 1.4 | 1.6 | 1.8 | 2 | 2 | 1.9 | 1.7 |
| Total Lord | 1.94 | 2.14 | 2.24 | 2.34 | 2.54 | 2.84 | 3.04 | 3.24 | 3.29 | 3.34 | 3.24 | 3.14 | 2.94 | 2.84 | 2.84 | 2.74 |
| PV Generator | 0.86 | 0.88 | 0.89 | 0.90 | 0.93 | 0.96 | 0.95 | 0.94 | 0.94 | 0.93 | 0.93 | 0.93 | 0.91 | 0.89 | 0.86 | 0.84 |
| Battery | 0.00 | 0.00 | 0.00 | 0.00 | 0.11 | 0.38 | 0.59 | 0.80 | 0.85 | 0.91 | 0.71 | 0.41 | 0.03 | −0.05 | 0.08 | 0.20 |
| Grid 1 | 0.18 | 0.46 | 0.65 | 0.84 | 1.00 | 0.90 | 0.80 | 0.50 | 0.30 | 0.10 | 0.00 | 0.00 | 0.00 | 0.00 | 0.00 | 0.00 |
| Grid 2 | 0.90 | 0.80 | 0.70 | 0.60 | 0.50 | 0.60 | 0.70 | 1.00 | 1.20 | 1.40 | 1.60 | 1.80 | 2.00 | 2.00 | 1.90 | 1.70 |
| Peak Cut Power | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 |
| Total Grid | 1.08 | 1.26 | 1.35 | 1.44 | 1.50 | 1.50 | 1.50 | 1.50 | 1.50 | 1.50 | 1.60 | 1.80 | 2.00 | 2.00 | 1.90 | 1.70 |

State represented in Table 1 is briefly described as follows: curve "load 1" in the first user increases from time segment "1" to "7", then decreases after the time segment "7", and then increases again after the time segment 14. Curve "load 2" in the second user gradually decreases from the time segment 1 to 5, ascends after the time segment 5, and has a peak around the time segments 13 and 14. Curve of "total load power" represents the sum total of these loads 1 and 2.

"PV generated power", approximately 0.90, is substantially constant over the entire time segments. Curve of power generation amount from the power storage system (indicated by the "power storage system") is zero from time segment "1" to "4", then increases after the time segment "4", then has a peak in the time segment "10", then decreases thereafter, and then increases again after the time segment "14". Curve of the "total grid power" is sum of these grid powers 1 and 2, and moderately increases in the from time segment "1" to "5", is constant in the time segments "5" to "10", then increases again after the time segment "11" correspondingly to increase of the grid power 2.

For power management in the group A, it is preferable to flatten "total grid power" used in the group by controlling discharge power from the power storage system appropriately, to reduce burden on the power plant. In the embodiment, such flattening for the power is performed in the time segments "5" to "10" of FIG. 5.

Hereafter, the description is made according to the flowchart.

As a result, in the time segment "1", the power storage system is not caused to discharge (step S10). The total load power of 1.94 in the group is provided by the total grid power (0.18+0.90=1.08), sum of the grid power 1 and the grid power 2, and the PV generated power of 0.86.

Also for the time segments "2" to "4", hereafter, the electric power management according to the flow similar to the above is performed.

Time Segments "5" to "10"

In these time segments, total grid power in the group is flattened by discharge from the power storage system.

First of all, in step S1, with the similar procedure above, the total load power of the group A is calculated. In this time segment, (load 1, load 2, total load power)=(2.04, 0.50, 2.54). Then, in step S2, the PV generated power (0.93) is calculated.

Next, in step S3, the determination is made as to whether the value of [total load power−PV generated power] is equal to or greater than the peak cut power. In this time segment, 2.54−0.93=1.51 being greater than the peak cut power of 1.5, the determination in step S3 is Yes.

Next, in step S4, determination is made as to whether the value of [total load power−PV generated power−peak cut power] is smaller than the value of [load 1−PV generated power]. In this time segment, since [total load power−PV generated power−peak cut power] is 2.54−0.93−1.50=0.11, being smaller than (load 1) 2.04−PV generated power 0.93=1.11, the determination in step S4 is Yes.

As a result, in step S5, the power storage system is to be caused to discharge at the value of [total load power−PV generated power−peak cut power] of 0.11.

According to the above, in the time segment "5", the total load power of 2.54 in the group is provided by the total grid power, sum of the grid power 1 and the grid power 2 (1.00+0.50=1.50), the PV generated power of 0.93, and the power of the power storage system of 0.11. It is noted that the "total grid power" is 1.50 which is the value of the peak cut power.

Also for the time segments "6" to "10", hereafter, the electric power management according to the flow similar to the above is performed. Accordingly, in these time segments, the state where the total grid power is 1.5 continues, and flattening of the power used in the group A is achieved.

Time Segments "11" to "16"

In these time segments, the power from the power storage system and the photovoltaic power generator are used for the first user, but the grid power is not used.

First of all, in step S1, with the similar procedure above, the total load power of the group A is calculated. In this time segment, (load 1, load 2, total load power)=(1.64, 1.60, 3.24). Then, in step S2, the PV generated power (0.93) is collected.

Next, in step S3, the determination is made as to whether the value of [total load power−PV generated power] is equal to or greater than the peak cut power. In this time segment, since 3.24−0.93=3.21, being greater than the peak cut power of 1.5, the determination in step S3 is Yes.

Next, in step S4, the determination is made as to whether the value of [total load power−PV generated power−peak cut power] is smaller than the value of [load 1−PV generated power]. In this time segment, since [total load power−PV generated power−peak cut power] is 3.24−0.93−1.50=0.81, being not smaller than (load 1): 1.64−PV generated power 0.93=0.71, the determination in step S4 is No.

Next, in step S6, determination is made as to whether the value of [load 1−PV generated power] is equal to or greater than the maximum discharge power of the power storage system (herein, 2.0). In this time segment, since 1.64−0.93=0.71 is less than the maximum discharge power of 2.0, the determination in step S6 is No.

As a result, the power storage system is to be caused to discharge at 0.71 which is the value of [load 1−PV generated power] (step S8). On the other hand, the grid power 1 becomes 0.00.

According to the above, in the time segment "11", the total load power 3.24 in the group is provided by the total grid power, sum of the grid power 1 and the grid 2 (0.00+1.60=1.60), the PV generated power of 0.93 and the power of the power storage system of 0.71.

Also for the time segments "12" to "16", hereafter, the electric power management according to the flow similar to the above is performed. It is noted that in the time segment "14" the discharge amount of the power storage system is −0.05 as a result of calculation, however, this means that the power storage system is charged by the PV generated power.

Although not shown in FIG. 5, if the determination in step S6 is Yes, then power storage system is caused to discharge at the maximum discharge power (step S7). Moreover, if the determination in step S9 is No, then the power storage system is caused to discharge at the value of [load 1−PV generated power] (step S11). It is noted that, in this case, since the value of [load 1−PV generated power] results in negative, the power storage system is to be charged.

According to the method of managing electric power of the embodiment as described above, the electric power management is performed not only for the first user 3A with the power storage system but also for the second user 3B without the power storage system. Specifically, since the data of the total load power in the group is collected (step S1), and next, the discharge amount of the power storage system is appropriately determined in steps S4 and S5 or the like, the total grid power used in the group can be flattened as shown in the time segments "5" to "10" of FIG. 5.

Figure 6:
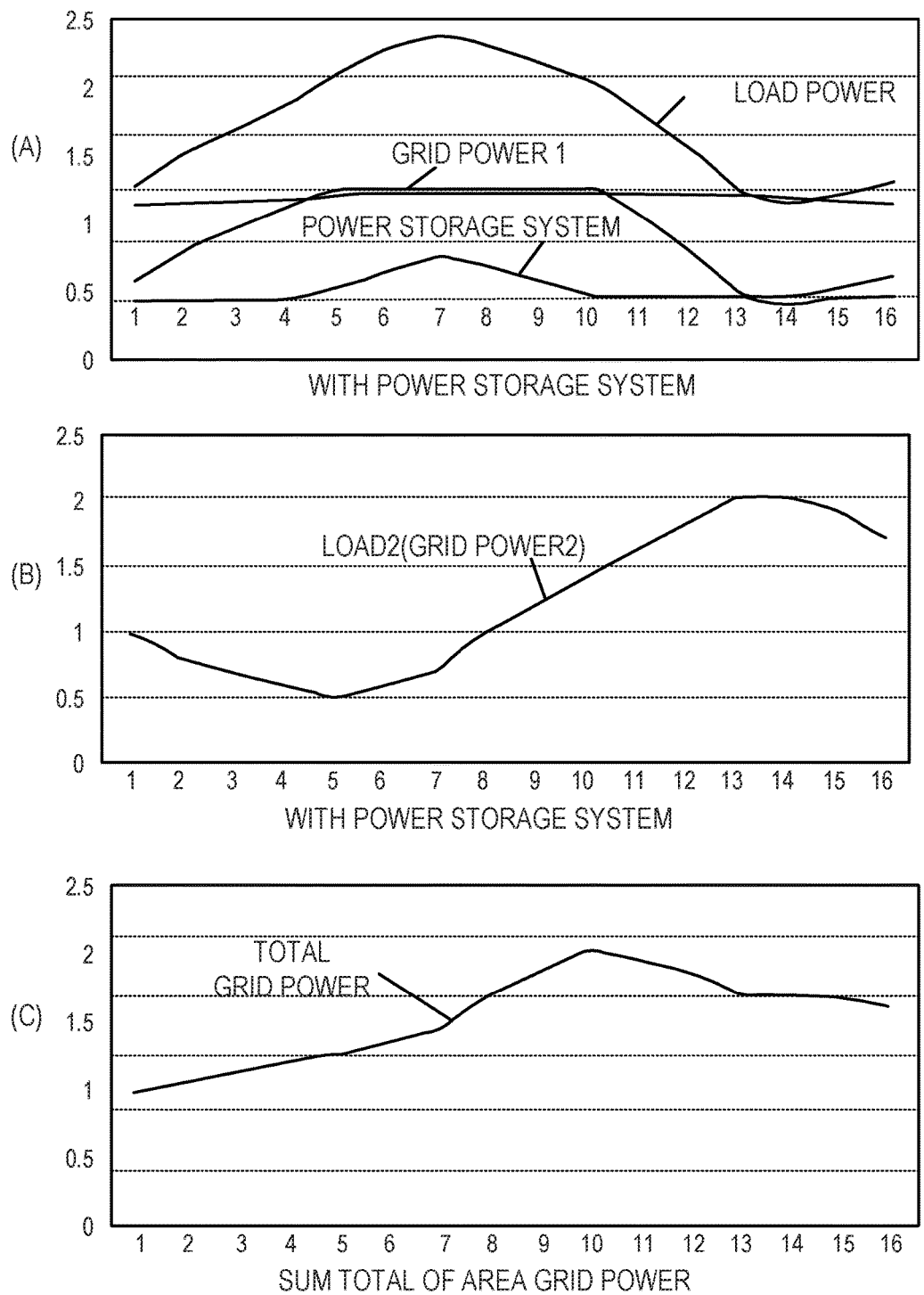
FIGS. 6(A) to 6(C) are graphs illustrating total grid power and the like, in a group, when conventional electric power management is performed.

FIGS. 6(A) to 6(C) are graphs showing the total grid power and the like in the group in the case where a conventional electric power management is performed. In the conventional method, the following management for electric power is performed only for user with the power storage system as in FIG. 6(A), when load power reaches a predetermined threshold: setting a grid power 1 an a peak cut power, the power storage system is configured to supply power to compensate for shortage. Conventional method does not manage a user without the power storage system (FIG. 6(B)). Accordingly, power used in the group, which is the sum of the grid powers in FIGS. 6(A) and 6(B), is to fluctuate while largely exceeding 1.50 as shown in FIG. 6(C).

On the contrary, according to the embodiment, the total grid power used in the group can be flattened as above and burden on the power plant and the like can be reduced.

While embodiments of the present invention have been described, the present invention is not limited to the above, but can be modified in various manners. For example:

(a) using of PV generated power is described by way of example in the above however, method may be implemented, with regarding a user as the "first user", which only have the power storage system but does not have the PV power generator. Moreover, the present invention is still effective in the case where the PV power cannot be used as in the night;

(b) only one power management device 60 is shown in FIG. 1 and FIG. 2, the power management device 60 is not limited to be configured as one physical device, but the power management device can be configured by using a plurality of computers (which may be connected to one another via a network); and (c) various numerical values of the power shown in Table 1 and FIG. 5 (for example, the value of the peak cut power) can be arbitrarily modified.

It is noted that the description also discloses inventions of a device and a program which correspond to the method inventions as described above.

The elements described above are not limited to be configured as separate components. For example, a configuration in which a plurality of constituents are assembled as one module may be used, a configuration in which one constituent is assembled by a plurality of modules may be used, a configuration in which a constituent is part of another constituent may be used, a configuration in which part of a constituent overlaps with part of another constituent may be used, or a similar configuration may be used.

The order of the operations shown in the flowchart above is not intended to limit the present invention but the order of the operations according to the present invention can be modified within a range where the contents thereof are not impaired. Moreover, occurrence of an operation may be allowed during performing another operation and timing of performing an operation may be allowed to overlap with timing of performing another operation partially or entirely, among others. Physical configurations of the element are not limited by the description of the embodiment above, and they may be provided independently, may be present in combination, or may be configured separately.

DESCRIPTION OF THE REFERENCE NUMERALS

1 SYSTEM FOR MANAGING ELECTRIC POWER
3A FIRST USER
3B SECOND USER
5 POWER PLANT
7 POWER NETWORK
13 POWER STORAGE SYSTEM
15 PHOTOVOLTAIC POWER GENERATOR
19 POWER MONITOR
21 BUILDING
22 AND 23 RESIDENCES
25 SYSTEM CONTROLLER
26 GPS CLOCKING MODULE
60 POWER MANAGEMENT DEVICE

The invention claimed is:

1. A power management device for managing power, within a group, wherein said power is to be used by a first user with a power storage system and a second user without the power storage system, the device comprising:
   (a) a unit that collects data regarding load power of the first user and the second user and calculating total load power within the group;
   (b) a unit that determines whether the total load power is equal to or greater than a peak cut power;
   (c) a unit that determines whether a value of (total load power−peak cut power) is smaller than the load power of the first user, when determination of the step (b) is Yes; and
   (d) a unit that causes the power storage system to discharge at the value of (total load power−peak cut power), when determination of the step (c) is Yes.

2. The power management device according to claim 1, further comprising:
   (e) a unit that determines whether the load power of the first user is equal to or greater than a maximum discharge power of the power storage system, when determination of (c) above is No;
   (d1) a unit that causes the power storage system to discharge at maximum discharge power, when determination of (e) above is Yes; and
   (d2) a unit that causes the power storage system to discharge at the load power of the first user, when the determination of (e) above is No.

3. The power management device according to claim 1, wherein the first user comprises a power generator, the device further comprising
   (a') a unit that collects data of power from the power generator of the first user (referred to as "generated power"), wherein
   the unit (b) determines whether a value of (total load power−generated power) is equal to or greater than the peak cut power, and
   the unit (d) causes the power storage system to discharge at a value of (total load power−total generated power−peak cut power), when the determination of (c) above is Yes.

4. The power management device according to claim 2, wherein
   the unit (e) determines whether a value of (load power of the first user−generated power) is equal to or greater than maximum discharge power of the power storage system, and
   the unit (d2) causes the power storage system to discharge at the value of (load power of the first user−generated power), when determination of the step (e) is No.

5. The power management device according to claim 3, wherein the power generator is a photovoltaic power generator.

6. A method of managing electric power for managing power, within a group, wherein said power is to be used by a first user with a power storage system and a second user without the power storage system, the method comprising:
   (a) collecting data regarding load power of the first user and the second user and calculating total load power within the group;
   (b) determining whether the total load power is equal to or greater than a peak cut power;
   (c) determining whether a value of (total load power−peak cut power) is smaller than the load power of the first user when determination in the step (b) is Yes; and
   (d) causing the power storage system to discharge at the value of (total load power−peak cut power), when determination in the step (c) is Yes.

7. The method of managing electric power according to claim 6, further comprising:
   (e) determining whether the load power of the first user equal to or greater than a maximum discharge power of the power storage system, when determination in the step (c) is No;
   (d1) causing the power storage system to discharge at maximum discharge power, when determination in the step (e) is Yes; and
   (d2) causing the power storage system to discharge at the load power of the first user, when the determination in the step (e) is No.

8. The method of managing electric power according to claim 6, wherein the first user comprises a power generator, the method further comprising:
   (a') collecting data of power from the power generator of the first user (referred to as "generated power"), wherein
   in the step (b), whether a value of (total load power−generated power) is equal to or greater than the peak cut power is determined, and
   in the step (d), discharging at a value of (total load power−total generated power−peak cut power) from the power storage system is performed, when the determination in the step (c) is Yes.

9. The method of managing electric power according to claim 7, wherein
   in the step (e), whether a value of (load power of the first user−generated power) is equal to or greater than maximum discharge power of the power storage system is determined, and
   in the step (d2), discharging at the value of (load power of the first user−generated power) from the power storage system is performed, when determination in the step (e) is No.

10. The method of managing electric power according to claim 8, wherein the power generator is a photovoltaic power generator.

* * * * *